United States Patent [19]

Taki

[11] Patent Number: 4,991,035
[45] Date of Patent: Feb. 5, 1991

[54] REPRODUCING A RECORDING FROM A ROTARY HEAD TYPE TAPE RECORDER WITH TRACKING CONTROL

[75] Inventor: Tetsuya Taki, Osaka, Japan

[73] Assignee: Sanyo Electric Co., Ltd., Osaka, Japan

[21] Appl. No.: 273,283

[22] Filed: Nov. 18, 1988

[30] Foreign Application Priority Data

Nov. 20, 1987 [JP] Japan ................ 62-294538

[51] Int. Cl.$^5$ ............... G11B 15/467; G11B 5/53
[52] U.S. Cl. .................. 360/70.00; 360/77.15; 360/73.05
[58] Field of Search ................. 360/8–10.3, 360/27, 32, 70, 18, 19.1, 73.04, 73.05, 73.09–73.14, 77.14, 77.15

[56] References Cited

U.S. PATENT DOCUMENTS 4,839,755  6/1989  Yamada et al. ............ 360/32

FOREIGN PATENT DOCUMENTS 62-55203   4/1987  Japan.
63-64604   3/1988  Japan.
2203864   10/1988  United Kingdom ......... 360/70

OTHER PUBLICATIONS

"Technology of Television–Ser. No. 427", Denshi Gijyutsu Syuppan Co., Ltd., Apr. 1987, pp. 109–117.

"Electronics Life", Nippon Housou Shuppan Kyoukai, Mar. 1987, pp. 11–66.

Primary Examiner—Aristotelis M. Psitos
Assistant Examiner—Stephen R. Garland
Attorney, Agent, or Firm—Armstrong, Nikaido, Marmelstein, Kubovcik & Murray

[57] ABSTRACT

A method of reproducing using a rotary head type tape recorder. The method is based on the detection or reproduction of a synchronizing signal of each ATF area which has been recorded and formed at the starting and terminal ends of each track of a magnetic tape. Crosstalk components of pilot signals from two tracks adjacent to a trace track are sampled, thereby to control a reproducing tracking according to an area division type ATF method. When reproducing the magnetic tape which has been recorded in a long-time mode, in which the tape travelling speed and the drum revolution speed are respectively set to ½ of the standard travelling speed and to ½ of the standard revolution speed, the tape travelling speed is set to ½ of the standard travelling speed (i.e., a travelling speed determined for the long-time mode), and the drum revolution speed is set to the standard revolution speed (i.e., a speed double of the revolution speed determined for the long-time mode). For every continuous two traces, the sampling is stopped for the ATF area at the terminal end of the succeeding trace, and the sampling is also stopped for the next continuous two traces. When reproducing the tape in the long-time mode, a high-precision tracking control is achieved to assure a good reproduction.

5 Claims, 8 Drawing Sheets

REPRODUCING A RECORDING FROM A ROTARY HEAD TYPE TAPE RECORDER WITH TRACKING CONTROL

FIELD OF THE ART

The present invention relates to a method of reproducing a tape recorder of the rotary head type such as a digital audio tape recorder of the rotary head type in which the reproduction tracking is controlled by an area division type ATF (Automatic Track Finding) method. More particularly, the present invention relates to a method of reproducing a magnetic tape in which sounds, images and the like have been digitally recorded at a speed equal to a half of the normal tape speed.

BACKGROUND OF THE PRIOR ART

As the rotary head type digital audio tape recorder of the type above-mentioned (hereinafter referred to as the R-DAT), there is known, for example, an audio tape recorder as shown in "Technology of Television—Serial No. 427", a monthly magazine published by Denshi Gijyutsu Syuppan Co., Ltd., in Apr., 1987, Pages 109 to 117 and in "Electronics Life", a monthly magazine published by Nippon Housou Shuppan Kyoukai in Mar. 1987, Pages 11 to 66.

According to such a tape recorder, a pair of rotary magnetic heads each having plus or minus azimuth are disposed at the rotary drum (head cylinder), as separated from each other by 180° on the periphery of the rotary drum. The rotary magnetic heads helically scan a magnetic tape travelling as wound on the drum at 90°. At the time of recording, the heads successively generate, on the tape in a guard bandless manner, tracks A and B in which digital audio signals (PCM audio signals), tracking control ATF signals and the like have been recorded in an area division format shown in FIG. 8.

Each of the tracks A and B has each of the azimuths of the pair of heads. The tracks are overlappingly recorded and generated such that each track has a width equal to $\frac{2}{3}$ of the width of each head.

Each of the tracks A and B consists of 196 blocks, each having a 288-bit signal length. From the trace starting end, each track is successively time-divided into a first sub code area SUB1, a first ATF area ATF1, a PCM area PCM, a second ATF area ATF2 and a second sub code area SUB2.

PCM audio signals are recorded in the PCM area PCM, and search signals, time signals and the like relating to the PCM audio signals are recorded, as sub information, in the first and second sub code areas SUB1 and SUB2. ATF signals required for tracking control at the time of reproduction, such as synchronizing signals and pilot signals, are recorded in the first ATF area ATF1 at the starting end and the second ATF area ATF2 at the terminal end, in a format of the 4-track completion type (to be discussed later).

Each of the first ATF area ATF1 and the second ATF area ATF 2 has a five-block length. When a synchronizing signal of a trace track is detected, the following signals are recorded, as the ATF signals, in time division in a pattern repeated at the period of four tracks in which the recording length and the recording order are changed;

(i) a tracking pilot signal having a single frequency $f_1$ (130.67 KHz);

(ii) a synchronizing signal as a sampling reference signal of which the frequency successively varies between $f_2$ and $f_3$ for every track; and (iii) an erasion signal as a margin having a single frequency $f_4$ (=1.568 MHz).

These signals are recorded such that the crosstalk components of the pilot signals from adjacent two tracks are sampled.

The frequency of the synchronizing signal is $f_2 = 522.67$ KHZ for the track A having a so-called plus azimuth, and $f_3 = 784.00$ KHz for the track B having a minus azimuth.

As to the recording length of each signal, five types of $0.5\ \tau$, $1\tau$, $1.5\ \tau$, $2\ \tau$, and $2.5\ \tau$ are available where the length of one block is defined as $1\ \tau$.

Figure 9:
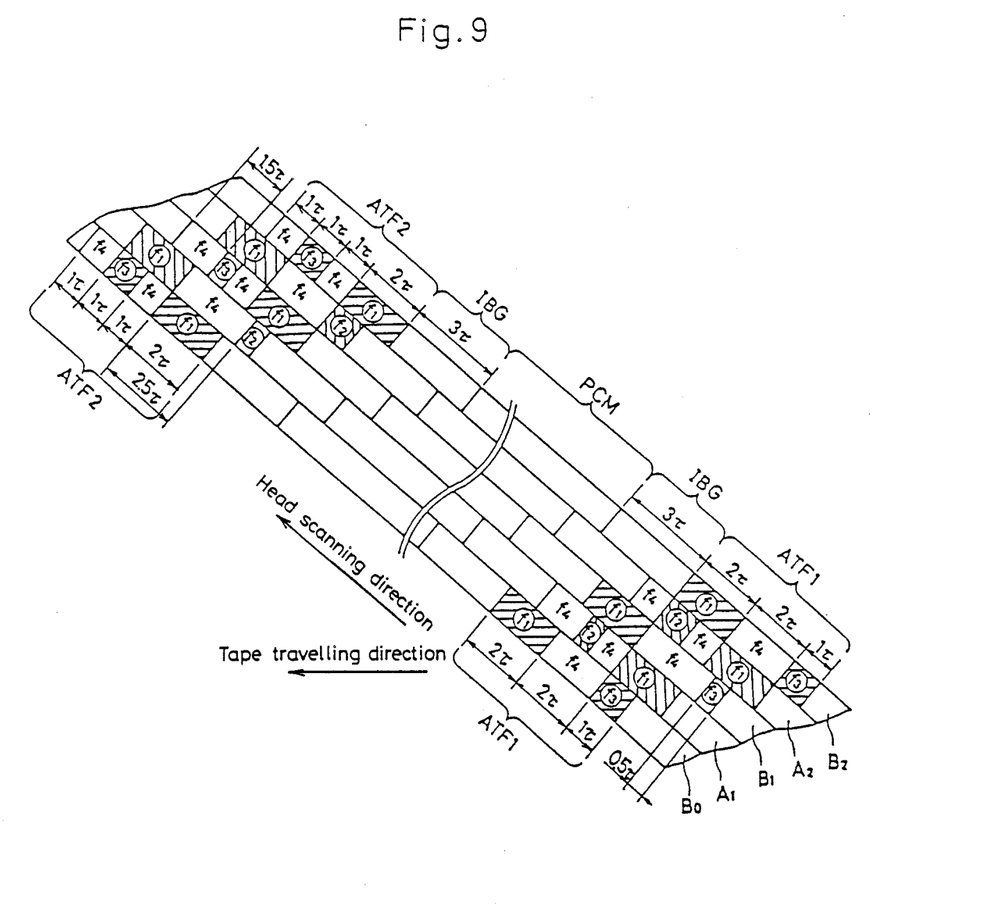
FIG. 9 is a view illustrating a format of ATF areas in a rotary head type digital audio tape recorder.

The following description will discuss, in detail, the format of the four-track completion type with reference to five continuous tracks $B$, $A_1$, $B_1$, $A_2$ and $B_2$ in FIG. 9 which shows, in an enlargement scale, the first ATF area ATF1 and the second ATF area ATF2.

It is now supposed that an $f_3$ synchronizing signal, an erasion signal and a pilot signal are successively recorded in the first track $B_0$ at the area ATF1 thereof from the trace starting end, these signals respectively having recording lengths of $1\tau$, $2\ \tau$; and $2\ \tau$. It is also supposed that a pilot signal, an erasion signal, an $f_3$ synchronizing signal and an erasion signal are successively recorded in the first track $B_0$ at the area ATF2 thereof from the trace starting end, these signals respectively having recording lengths of $2\ \tau$, $1\ \tau$, $1\tau$ and $1\tau$.

In this case, a pilot signal, an erasion signal, an $f_2$ synchronizing signal and an erasion signal are successively recorded in the second track $A_1$ at the area ATF1 thereof from the trace starting end, these signals respectively having recording lengths of $2\ \tau$, $1\ \tau$, $0.5\ \tau$ and $1.5\ \tau$. An $f_2$ synchronizing signal, an erasion signal and a pilot signal are successively recorded in the second track $A_1$ at the area ATF2 thereof from the trace starting end, these signals respectively having recording lengths of $0.5\ \tau$, $2.5\ \tau$ and $2\ \tau$.

An $f_3$ synchronizing signal, an erasion signal and a pilot signal are successively recorded in the third track $B_1$ at the area ATF1 thereof from the trace starting end, these signals respectively having recording lengths of $0.5\ \tau$, $2.5\ \tau$ and $2\ \tau$. A pilot signal, an erasion signal, an $f_3$ synchronizing signal and an erasion signal are successively recorded in the third track $B_1$ at the area ATF2 thereof from the trace starting end, these signals respectively having recording lengths of $2\ \tau$, $1\ \tau$, $0.5\ \tau$ and $1.5\ \tau$.

A pilot signal, an erasion signal, an $f_2$ synchronizing signal and an erasion signal are successively recorded in the fourth track $A_2$ at the area ATF1 thereof from the trace starting end, these signals respectively having recording lengths of $2\ \tau$, $1\ \tau$, $1\ \tau$ and $1\ \tau$. An $f_2$ synchronizing signal, an erasion signal and a pilot signal are successively recorded in the fourth track $A_2$ at the area ATF2 thereof from the trace starting end, these signals respectively having recording lengths of $1\ \tau$, $2\ \tau$ and $2\tau$.

As to the fifth track $B_2$, the areas ATF1 and ATF2 thereof have the same recording patterns to those of the areas ATF1 and ATF2 of the first track $B_0$, respectively.

A margin gap IBG having a length of $3\ \tau$ is disposed between the area ATF1 and the PCM area PCM and between the area ATF2 and the PCM area PCM.

At the time of reproduction, a head trace is controlled by tracking control discussed in the following.

The head gap width is 1.5 time the width of each of the tracks A and B. Accordingly, a reproduced signal from each head generally includes a signal component of the trace track and crosstalk components from two tracks adjacent to the trace track.

The levels of both crosstalk components vary with the trace position. When the head center coincides with the track center to provide an on-track position, the levels of both crosstalk components are equal to each other.

It is apparent from FIG. 9 that, when a normal reproduction is made in which a tape T travels in the same direction as that at the recording time such that both areas ATF1 and ATF2 of the tracks A and B are scanned, the pilot signal of the right-hand track i.e., the succeeding track is crosstalked while that portion of the trace track in which the synchronizing signal has been recorded is scanned. After such scanning, the pilot signal of the left-hand track, i.e., the preceding track is crosstalked.

Based on a head changeover pulse signal (RFSW signal) of which level is inverted for every half-turn of the head cylinder;

(i) the next trace head may be identified; and (ii) the frequency of the synchronizing signal of each of the ATF areas ATF1 and ATF2 of the next trace track may be estimated.

At the time of reproduction, the crosstalk components of the pilot signals of adjacent two tracks are sampled and extracted based on:

(i) the identification of the trace head by the RF pulse signal;

(ii) the estimation of the frequency of each synchronizing signal of the trace track; and (iii) the detection of the synchronizing signal of each of the ATF areas ATF1 and ATF2 of the trace track.

A difference in level between both crosstalk components is then operated, thereby to generate a tracking control signal, i.e., a tracking error signal which is proportional to the level difference.

The level of the tracking error signal varies with a shift in trace position between both heads. Accordingly, based on the tracking error signal, the tape T is controlled in travelling phase such that both heads are brought to the on-track position, thereby to control the head traces.

In the R-DAT, a tape is normally recorded and reproduced with the tape travelling speed and the drum revolution speed respectively set to the standard travelling speed 8,150 mm/sec. and the standard revolution speed 2,000 r.p.m. in the standard mode. However, only in a long-time mode called Option 2, the tape may be recorded in a double period of time with the tape travelling speed and the drum revolution speed respectively lowered to 4,075 mm/sec. i.e., a half of the standard travelling speed and to 1,000 r.p.m. i.e., a half of the standard revolution speed.

The tape recorded in the long-time mode may be reproduced with the tape travelling speed set to 4,075 mm/sec, i.e., the same travelling speed as that used at the recording time. According to the standards of the R-DAT, the drum revolution speed at the reproduction time is to be also set to the speed determined for the long-time mode used at the time of recording.

However, when the tape is reproduced in the long-time mode with the use of the same travelling speed and the same revolution speed as those used at the recording time, the tape/head relative speed is lowered to ½ of that in the standard mode and the frequency of the reproduced signal from each head is also lowered to ½ of that in the standard mode.

Accordingly, if the characteristics of the electromagnetic conversion system such as the heads, a rotary transformer and the like, as well as the characteristics of the reproduction circuit system such as a reproduction equalizer circuit and the like, are set based on the signal characteristics in the standard mode, an electromagnetic conversion processing, a reproduction equalizer processing and the like may not be executed in the best conditions at the time of reproduction in the long-time mode.

Therefore, when the drum revolution speed at the time of reproduction in the long-time mode is to be set to the revolution speed determined for the long-time mode, it is required to switch the characteristics of the electromagnetic conversion system, the characteristics of the reproduction equalizer and the like, from the characteristics in the standard mode. This disadvantageously presents problems of complicating the entire arrangement and the like.

In view of the foregoing, there is proposed, for example, an arrangement as shown in Japanese Utility Model Laid-Open Publication 55205/1987 (G11B 5/09) in which, at the time of reproduction in the long-time mode, the drum revolution speed is changed to a speed double the revolution speed predetermined for the long-time mode, i.e., the standard revolution speed, such that reproduction is carried out without changing the characteristics of the electromagnetic conversion system, the reproduction circuit system and the like.

In this case, the drum revolution speed at the reproduction time is double the speed used at the recording time. Accordingly, each head scans the tape at a speed double the speed determined for the long-time mode, and the tape is repeatedly scanned substantially at the same position thereof by both heads. That is, the tape is reproduced by a so-called double scanning method.

It is therefore difficult to achieve tracking control using the above-mentioned ATF signals. Accordingly, in the system disclosed by the above-mentioned Publication, the tracking control is not made, but based on the detection of an error in a reproduced signal, a reproduction processing is made by selecting a reproduced PCM audio signal and a PCM signal as sub information which are less erroneous.

However, when reproduction is made without tracking control, the trace position of each head deviates from the on-track position from time to time due to tracking shift. This causes the head reproduction level to be lowered to considerably deteriorate the error rate in each reproduced signal. This fails to achieve a good reproduction. Further, if a state in which the error rate is deteriorated, continuously takes place, this creates the problem that reproduction cannot even be made.

OBJECTS OF THE INVENTION

It is an object of the present invention to provide a rotary head type tape recorder reproducing method capable of achieving a good reproduction with high-accuracy tracking control, according to which a rotary head type tape recorder such as a rotary head type digital audio tape recorder in which reproduction tracking is controlled by the area division type ATF method, is reproduced in a long-time mode by a double scanning method in which the drum revolution speed is set to a speed double the revolution speed determined for the long-time mode, i.e., the standard revolution speed.

DISCLOSURE OF THE INVENTION

The present invention provides a method of reproducing a rotary head type tape recorder having the steps of:

helically scanning a magnetic tape travelling as wound on a rotary drum at a predetermined angle by a pair of rotary magnetic heads each having plus or minus azimuth, the rotary magnetic heads disposed on the rotary drum separated from each other by 180° at the peripheral edge of the drum;

successively generating tracks on the magnetic tape in a guard bandless manner, each track having a width narrower than the gap width of each head;

forming ATF areas on each of the tracks at the starting and terminal ends thereof, in each of the AFT areas at least (i) a synchronizing signal as a sampling reference signal and (ii) a pilot signal as a tracking signal are recorded in a pattern repeated for a few tracks in which the signal frequency and recording length are changed;

sampling, at the time of reproduction, crosstalk components of the pilot signals from two tracks adjacent to a trace track, based on detection of each of the synchronizing signals of the trace track at the starting and terminal ends thereof;

generating a tracking control signal proportional to a difference in level between both crosstalk components;

holding the tracking control signal until the next sampling is carried out; and controlling the tape travelling phase based on the control signal, thereby to achieve tracking control of the heads.

The method of reproducing a rotary head type tape recorder in accordance with the present invention is characterized in that:

when reproducing a magnetic tape which has been recorded in the long-time mode in which the tape travelling speed and the drum revolution speed are respectively set to a half of the standard travelling speed and to a half of the standard revolution speed, the tape travelling speed is set to a half of the standard travelling speed and the drum revolution speed is set to the standard revolution speed; and that for every continuous two traces, the sampling operation is stopped for the ATF area of the succeeding trace at the terminal end thereof and the sampling operation is also stopped for the next continuous two traces.

According to the method of the present invention, when reproducing a tape in the long-time mode, the rotary drum is rotated at the standard revolution speed to reproduce the tape by a double scanning method. At this time, the heads trace or scan the tape at a speed double the revolution speed determined for the long-time mode. Accordingly, in this case the trace position is moved in a widthwise direction by a distance corresponding to ½ of the track width as compared with the trace position at the time of standard reproduction with the use of the standard travelling speed and the standard revolution speed. Further, with the increase in the revolution speed of the rotary drum, the head scanning direction is inclined, at an extremely small angle, toward the preceding trace with respect to the track direction.

For every continuous two traces, the sampling operation is stopped for the ATF area of the succeeding trace at the terminal end thereof, as well as for the next continuous two traces. Accordingly, for every two traces, the sampling operation is made for the ATF areas of the preceding trace at the starting and terminal ends thereof and for the ATF area of the succeeding trace at starting end thereof. Based on the sampling results, the direction in which each head is brought to the ontrack position at the starting end of the succeeding trace, is opposite to the direction in which each head is brought to the on-track position at the terminal end of the preceding trace. Further, based on the result obtained by the sampling operation made for the ATF area of the preceding trace at the starting end thereof, the inclination of the head scanning direction is continuously corrected until the sampling operation is made for the ATF area at the starting end of the preceding trace out of the next two traces. Accordingly, each head may be controlled such that it is brought substantially to the on-track position. Thus, a high-precision tracking control may be achieved by the double scanning method, thereby to assure a good reproduction.

BRIEF DESCRIPTION OF THE DRAWINGS

FIG. 2 (a)–(d) are timing charts of sampling pulses used in the embodiment shown in FIG. 1;

DETAILED DESCRIPTION OF THE PREFERRED EMBODIMENTS

The following description will discuss an embodiment of the present invention applied to a rotary head type digital audio tape recorder (R-DAT), with reference to FIG. 1 to FIG. 7.

Figure 1:
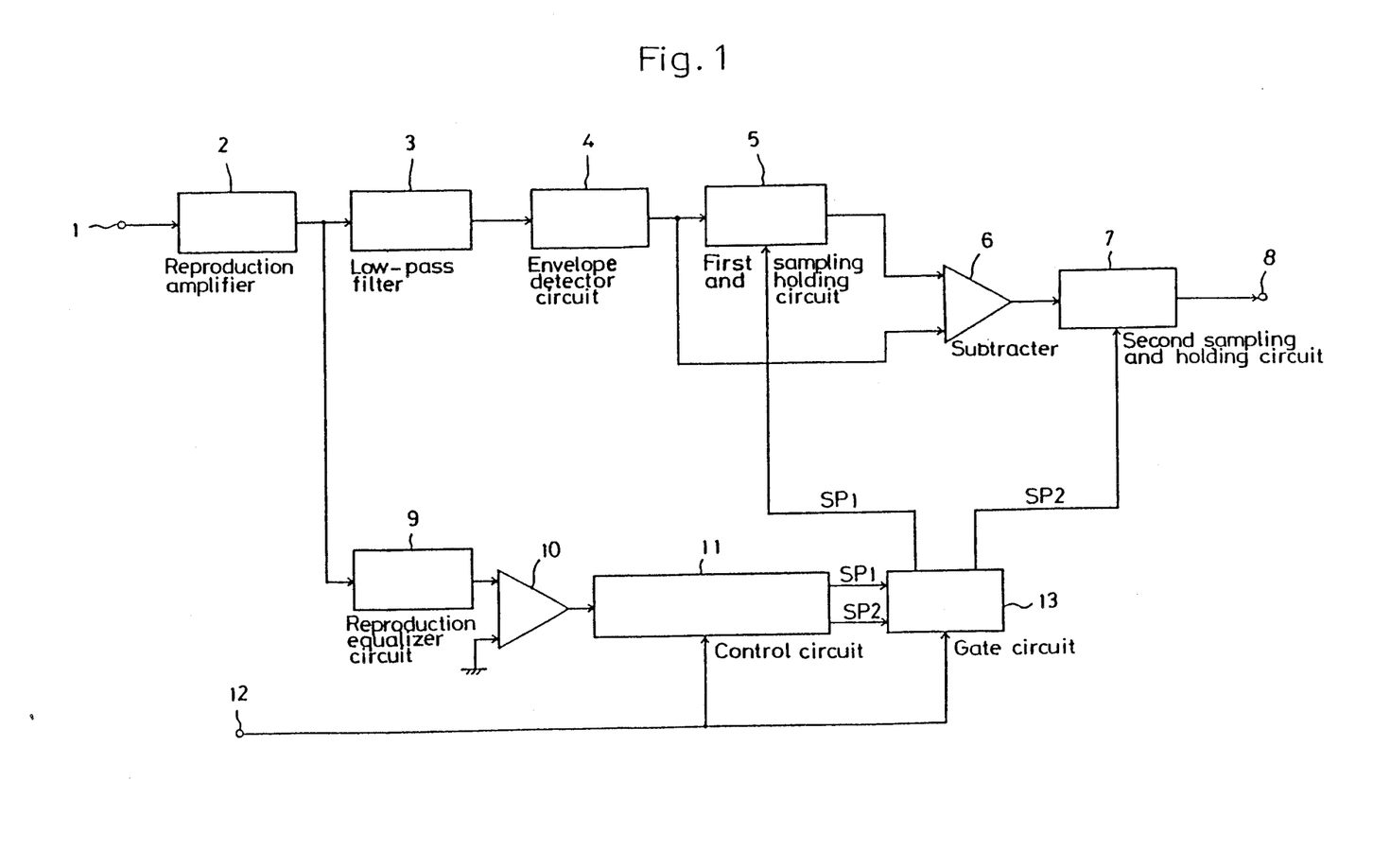
FIG. 1 is a block diagram of an embodiment of reproducing method in accordance with the present invention.

In FIG. 1 showing a tracking control block, a reproduction input terminal 1 is to receive a reproduced signal from each rotary magnetic head through a rotary transformer and a head changeover switch. A reproduction amplifier 2 is connected to the input terminal 1. A low-pass filter 3 for extracting a pilot signal is connected to the amplifier 2. An envelope detector circuit 4 is connected to the filter 3.

A first sampling and holding circuit 5 is connected to the detector circuit 4 for sampling an input signal by a sampling pulse SP1. A subtracter 6, comprising a differential amplifier, is to output a difference in level between a holding signal of the sampling and holding circuit 5 and an output signal of the detector circuit 4.

A second sampling and holding circuit 7 is connected to the subtracter 6 for sampling an input signal by a sampling pulse SP2. The second sampling and holding circuit 7 is to sample an input signal. As a tracking control signal, i.e., a tracking error signal for controlling the tape travelling phase, an output signal of the second sampling and holding circuit 7 is supplied from a control output terminal 8 to a capstan motor drive circuit.

A reproduction equalizer 9 is connected to the amplifier 2 for equalizing waveforms. A digital conversion comparator 10 comprising a zero cross comparator is to convert an output signal from the equalizer circuit 9, into a binary value. A logic control circuit 11 comprising a microcomputer and the like, is connected to the comparator 10 for generating a sampling pulse. The logic control circuit 11 is to detect, in a digital manner, that a synchronizing signal has been reproduced by an output signal of the comparator 10. Such detection is made based on a head changeover pulse signal of an RFSW input terminal 12, i.e., an RFSW signal, and based on a clock signal as an operation reference signal of the R-DAT. For each detection, the control circuit 11 is to carry out a timer operation to calculate the timings at which the pilot signals from adjacent two tracks are crosstalked. In such timings, the sampling pulses SP1 and SP2 are respectively generated and supplied.

A gate circuit 13 is connected to the control circuit 11 for selectively supplying, at the time of reproduction in the long-time mode, the sampling pulses SP1 and SP2 to the sampling and holding circuits 5 and 7, respectively, based on the RFSW signal from the input terminal 12 and a reproduction mode signal.

Except for the gate circuit 13, all the above-mentioned circuits form a conventional R-DAT tracking control block.

The following description will discuss the operation of the above-mentioned block.

At the time of reproduction, a reproduced signal from each head is supplied to the amplifier 2 through the input terminal 1. The reproduced signal thus amplified is entered into the filter 3 and the equalizer circuit 9.

The filter 3 removes that component of the reproduced signal of which frequency is higher than that of the pilot signal, and extracts only a component having frequency substantially equal to the frequency of the pilot signal (hereinafter referred to as a pilot component). The pilot component thus extracted is supplied from the filter 3 to the detector circuit 4.

When the detector circuit 4 carries out an envelope detection, the detector circuit 4 supplies, to the sampling and holding circuit 5 and the subtracter 6, an envelope detection signal having the pilot component of the reproduced signal.

On the other hand, the reproduced signal equalized in waveform by the equalizer circuit 9 is supplied to the comparator 10 which, in turn, converts the reproduced signal into a digitalized binary value.

By the waveform equalization and the digitalization, the comparator 10 supplies, as an output signal, a digital signal based on a signal component of which level considerably varies, i.e. a trace track signal component included in the reproduced signal.

The digital signal from the comparator 10 is supplied to the control circuit 11. When the control circuit 11 detects a synchronizing pattern, the digital signal from the comparator 10 is sampled at intervals of a clock signal which has frequency of 9,408 MHz and serves as an operation reference signal. The inversion cycle of the digital signal of the comparator 10 is then detected. Each time the inversion cycle becomes equal to the cycle of the frequency $f_2$ (=522.67 KHz) or $f_3$ (=784.00 KHz) of the synchronizing signal, a synchronizing detection pulse is generated.

When the control circuit 11 carries out a track identification, it is estimated which track is the next trace track to be switched by the RFSW signal, out of four tracks, for example, $A_1$, $B_1$, $A_2$ and $B_2$ of the four-track completion type as shown in FIG. 9. While the synchronizing signal is being reproduced, the trace track is determined.

Figure 8:
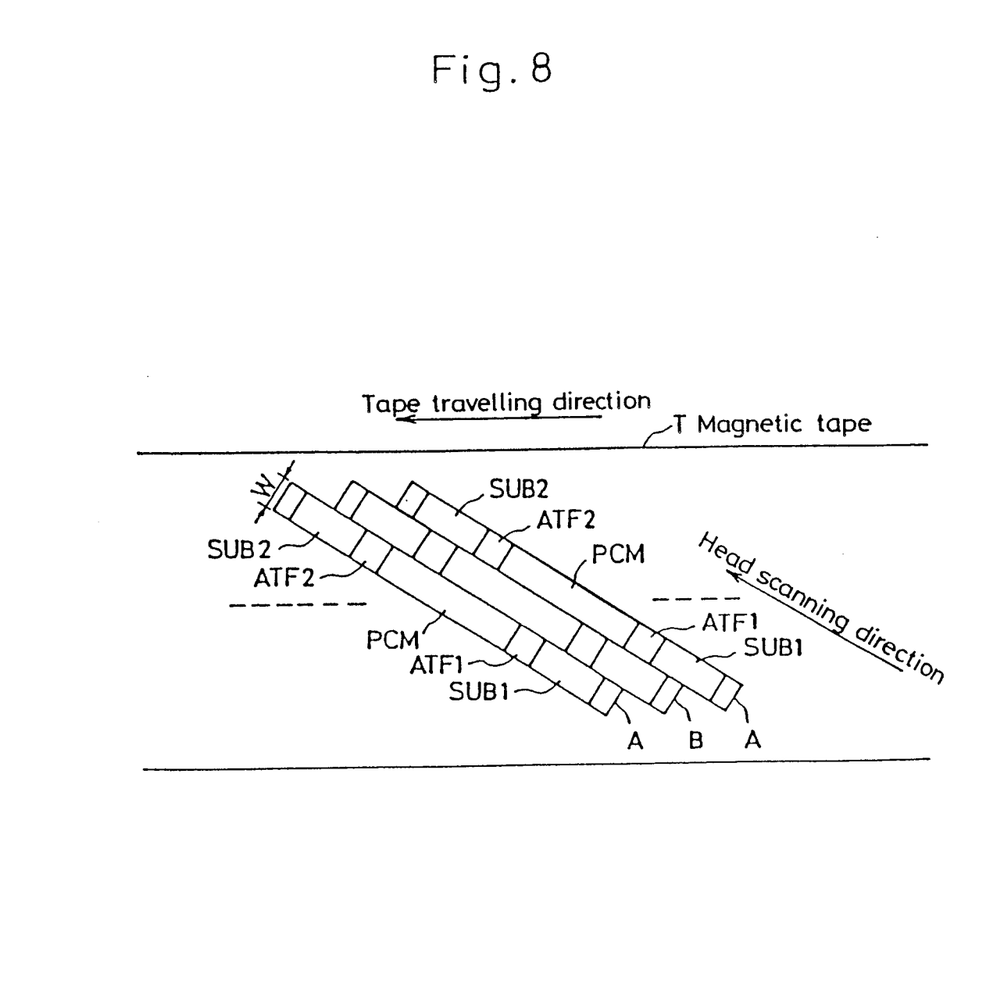
FIG. 8 is a view of a track pattern in a rotary head type digital audio tape recorder.

When the trace track is determined and when it is detected that each of the synchronizing signals of the first and second ATF areas ATF1 and ATF2 of the trace track shown in FIGS. 8 and 9 has been reproduced, the sampling pulses SP1 and SP2 are generated and supplied to the gate circuit 13 in timings that the pilot signals from the adjacent two tracks are crosstalked.

As apparent from FIG. 9, in the tracks $A_1$, $B_1$, $A_2$ and $B_2$ forming one cycle, the synchronizing signal of the area ATF2 has a length of 0.5 $\tau$ in the tracks $A_1$ and $B_1$ in which the synchronizing signal of the area ATF1 has a length of 0.5 $\tau$. The synchronizing signal of the area ATF2 has a length of 1 $\tau$ in the tracks $A_2$ and $B_2$ in which the synchronizing signal of the area ATF1 has a length of 1 $\tau$.

When reproduction of the synchronizing signal starts and generation of a synchronizing detection pulse also starts, an output signal from the detector circuit 4 has a pilot component crosstalked from one track out of the adjacent two tracks, i.e., the succeeding track to be scanned next to the trace track, the succeeding track being shown at the right hand with respect to each track in FIG. 9 (hereinafter referred to as the R-track). After about 2 $\tau$ has passed from the start of entry of the synchronizing detection pulse, the output signal from the detector circuit 4 has a pilot component crosstalked from the other track of the adjacent two tracks, i.e., the preceding track scanned previously to the trace track, the preceding track being shown at the left hand with respect to each track in FIG. 9 (hereinafter referred to as the L-track).

Upon start of generation of the synchronizing detection pulse, the control circuit 11 immediately starts generating the sampling pulse SP1 and counting the number of synchronizing detection pulses. It is determined whether or not the counted number of the synchronizing detection pulses reaches the value 0.5 $\tau$ or 1 $\tau$ previously set based on the estimation of trace track. Based on this determination, it is determined whether or not the synchronizing signal has been reproduced. Then, the trace track is determined. After 2 $\tau$ has passed from the start of counting the synchronizing detection pulses, the sampling pulse SP2 is generated.

Accordingly, when each head scans the area ATF1 and the area ATF2, the control circuit 11 supplies the sampling pulses SP1 and SP2 to the gate circuit 13 in timings that the pilot components of the adjacent two tracks are crosstalked.

Figure 2A:
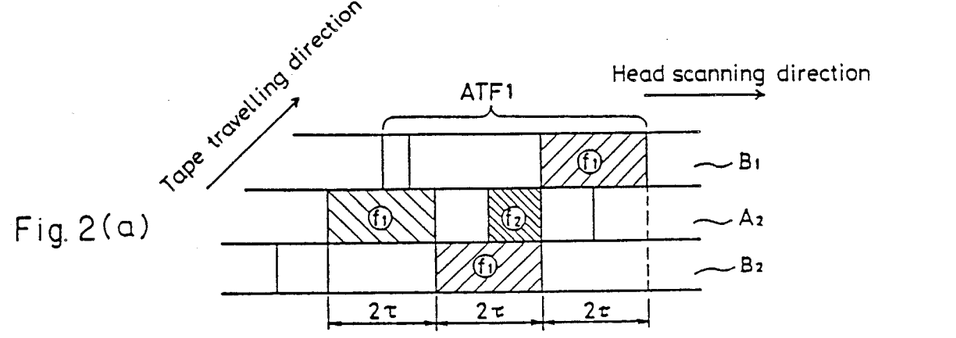
Figure 2B:
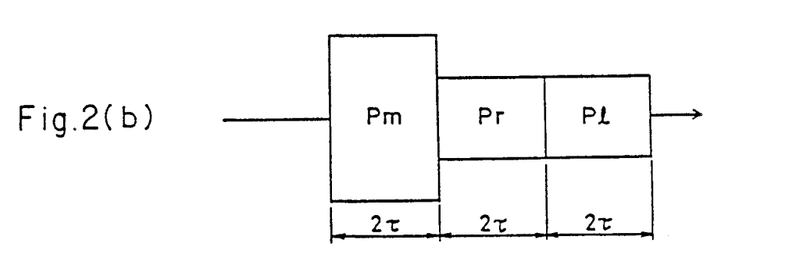
Figure 2C:
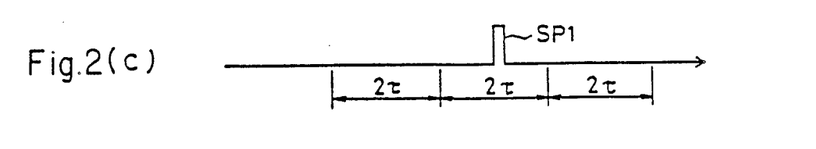
Figure 2D:
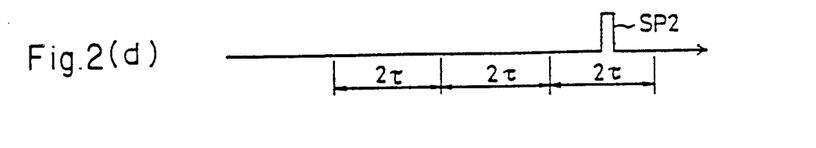

For example, it is now supposed that the trace track is the track $A_2$ in FIG. 9. As shown in FIG. 2 (a), when the first ATF area ATF1 of the track A is scanned, a pilot signal having a length of 2 $\tau$ is reproduced as a reproduced signal of the trace track $A_2$. After an interval of 1$\tau$, a synchronizing signal with frequency $f_2$ having a length of 1 $\tau$ is reproduced. In this case, the pilot signals from the R- and L-tracks $B_2$ and $B_1$ are crosstalked during and after the synchronizing signal of the trace track $A_2$ is reproduced.

The output signal from the detector circuit 4 varies as shown in FIG. 2 (b) in which Pm is the pilot signal of the trace track A₂, and Pr and Pl are the pilot components crosstalked from the R- and L-tracks B₂ and B*l*, respectively. The sampling pulses SP1 and SP2 are respectively supplied in timings shown in FIG. 2 (c) and (d).

When reproducing a tape in the standard mode, i.e., when reproducing the tape with the tape travelling speed and the drum revolution speed respectively set to the standard travelling speed and the standard drum revolution speed which are the same as those used at the recording time, the gate circuit 13 supplies the sampling pulses SP1 and SP2, as they are, to the sampling and holding circuits 5 and 7, respectively.

Based on the sampling pulse SP1 supplied to the sampling and holding circuit 5 through the gate circuit 13, the sampling and holding circuit 5 samples and holds the pilot component crosstalked from the R-track.

The subtracter 6 subtracts the output signal of the sampling and holding circuit 5 from the output signal of the detector circuit 4. When the detector circuit 4 supplies an output signal of the pilot component Pl crosstalked from the L-track, the subtracter 6 supplies an output signal proportional to a difference in level between the pilot components crosstalked from the adjacent two tracks.

Based on the sampling pulse SP2 supplied to the sampling and holding circuit 7 through the gate circuit 13, the sampling and holding circuit 7 samples and holds the output signal of the subtracter 6. Accordingly, a tracking error signal supplied from the sampling and holding circuit 7 to the capstan motor drive circuit through the output terminal 8, is a signal having S-shape characteristics which is proportional to a difference in level between the pilot components crosstalked from the adjacent two tracks. Based on this tracking error signal, the tape travelling phase is controlled.

At the time of reproduction in the standard mode, the tape travelling speed and the drum revolution speed are the same as those used at the recording time. Accordingly, the head scanning direction extends along the track direction.

The tape travelling phase is variably controlled such that the head center coincides with the track center. When the pilot components crosstalked from the adjacent two tracks are equal to each other in level and the tracking error signal is 0 in level, the head center coincides with the track center, thus providing a complete on-track position.

Figure 7:
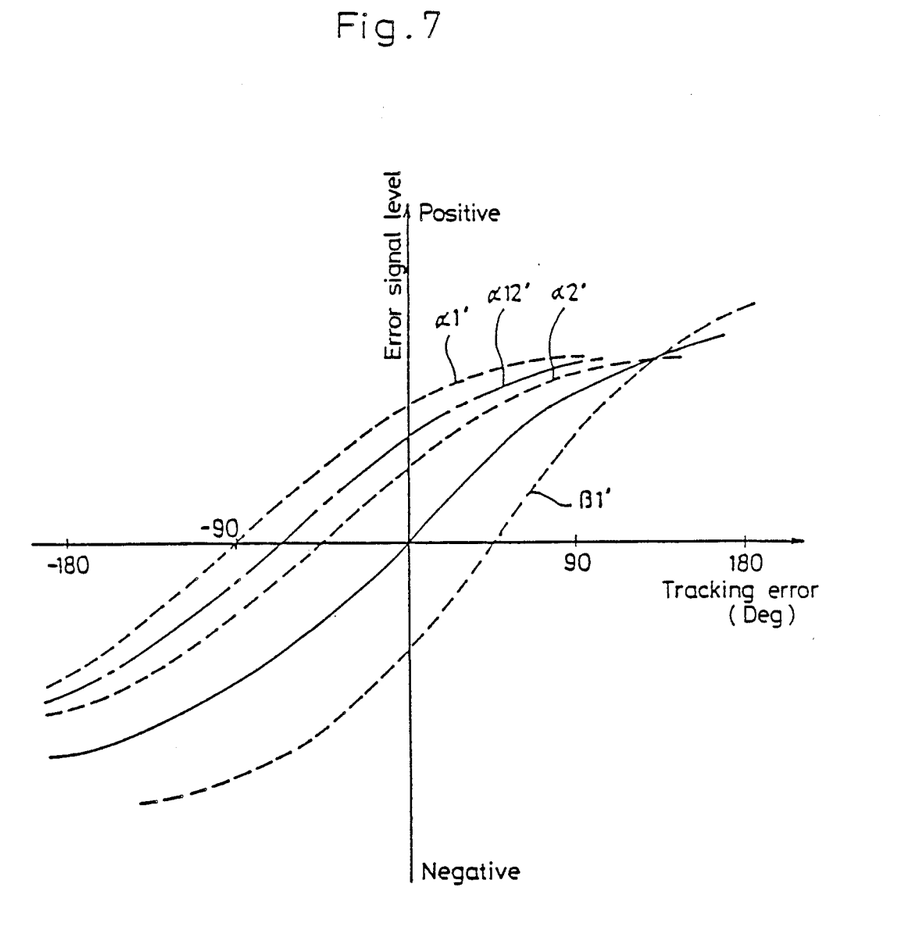

More specifically, when reproducing the tape in the standard mode, the tracking error signal varies, according to the tracking shift, in the form of the S-shape characteristics substantially proportional to the characteristics shown by the solid line in FIG. 7. Based on this error signal, each head is brought to the complete on-track position.

On the other hand, when reproducing the tape in the long-time mode, the tape is reproduced by the double scanning method. Accordingly, the tape travelling speed is set to the travelling speed determined for the longtime mode which is the same as that used at the recording time, and the drum revolution speed is set to a speed double the drum revolution speed used at the recording time, i.e., a speed double the drum revolution speed determined for the long-time mode.

Figure 3:
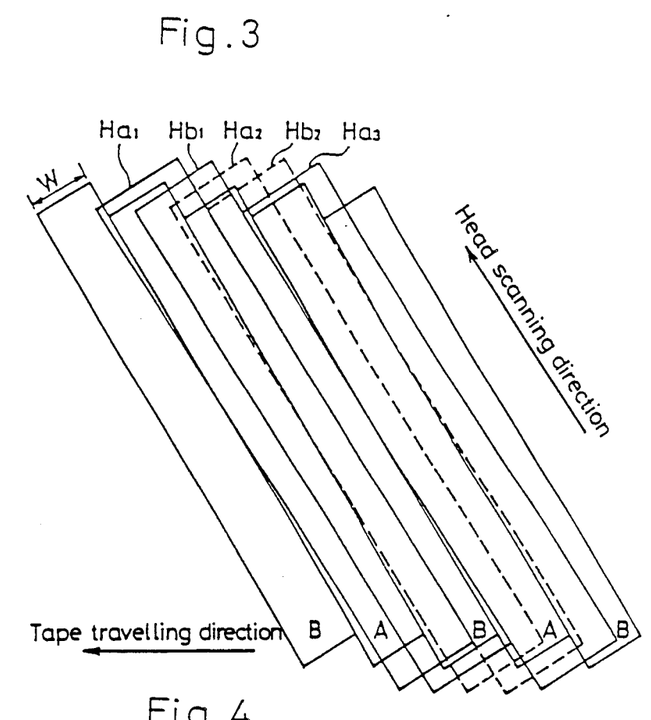
FIG. 3 and FIG. 4 are views illustrating the head traces generated by the embodiment shown in FIG. 1.
Figure 4:
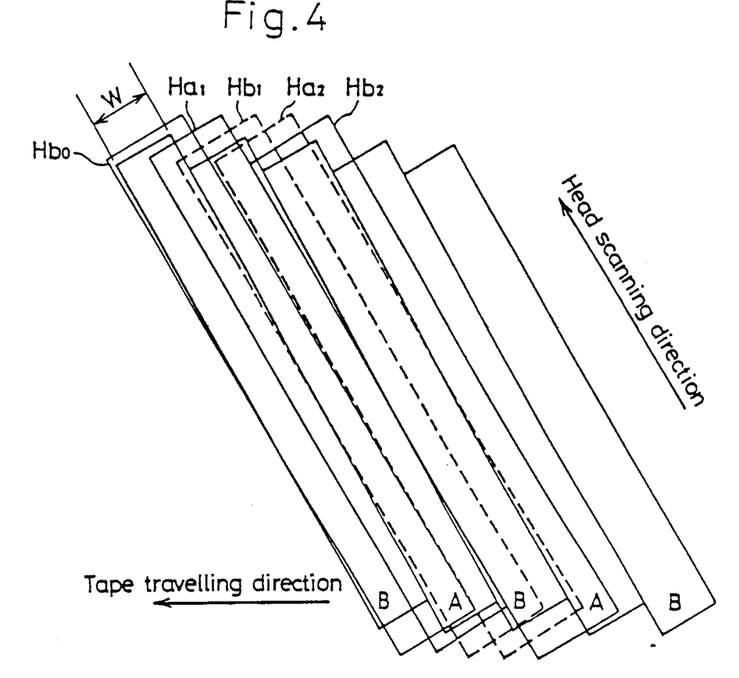

At this time, based on a difference between the drum revolution speeds at the recording time and at the reproducing time, each trace terminal end position on the tape is shifted in an extremely small amount in the advancement direction (the left hand in FIG. 9). Also, the head scanning direction is angularly shifted in an extremely small amount with respect to the tracking direction, as shown in FIGS. 3 and 4. When each head scans, the scanning amount is equal to only ½ of that in the standard mode. Accordingly, both heads doubles-can each track.

FIGS. 3 and 4 show (i) tracks A and B which are successively formed, and (ii) head traces Ha1, Hb1, Ha2, Hb2 and Ha3, among which the head traces Ha1, Ha2 and Ha3 are the traces scanned by the head having the same azimuth as that of the track A, and the traces Hb1 and Hb2 are the traces scanned by the head having the same azimuth as that of the track B.

Even when reproducing the tape in the long-time mode, the tape may be reproduced without switching the characteristics of the electromagnetic conversion system such as the heads and the rotary transformers, as well as the characteristics of the amplifier 2 and the equalizer circuit 9. The tracking control block shown in FIG. 1 is operated. At this time, since the drum revolution speed is higher than that used at the recording time, (i) the electromagnetic conversion, (ii) the amplification by the amplifier 2 and (iii) the equalization of waveforms by the equalizer circuit 9 are carried out with the characteristics substantially equal to those at the time of reproduction in the standard mode.

The RFSW signal of the input terminal 12 shown in FIG. 5 (a), i.e, the RFSW signal having the same cycle as that at the reproduction in the standard mode, is supplied to the control circuit 11. Each time the level of the RFSW signal is inverted, i.e., each time the rotary drum makes a half turn, the trace head is switched.

Figure 5A:
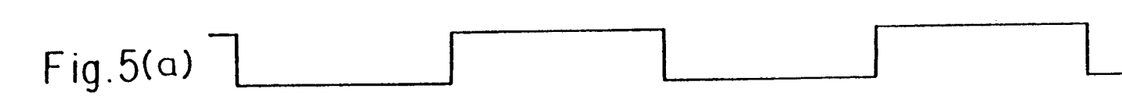
FIGS. 5(a)–(e) are timing charts illustrating the operation made by the embodiment shown in FIG. 1.
Figure 5B:
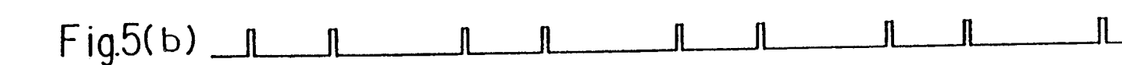
Figure 5C:
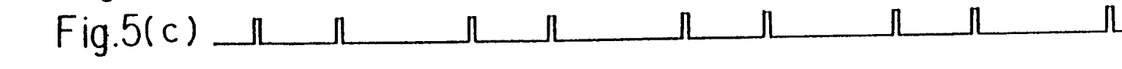
Figures 5D, 5E:
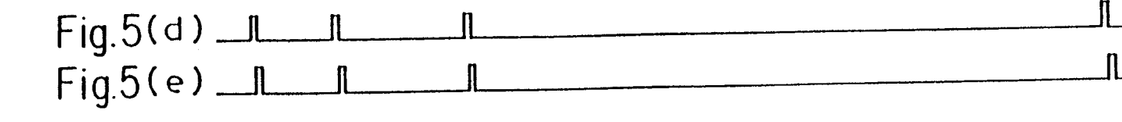

The RFSW signal level inversion timing and the trace head changeover timing are the same as those in the reproduction in the standard mode. The control circuit 11 is operated in the same manner as in the reproduction in the standard mode. When the synchronizing signal of a trace track is reproduced for every scanning of each head, the control circuit 11 generates and supplies the sampling pulses SP1 and SP2 in the timings shown in FIG. 5 (b) and (c), respectively.

The tape travels as wound on the rotary drum at 90°. Accordingly, each of the heads reproduces the tape for a period of time of each forward half portion of the high and low levels of the RFSW signal, i.e. for a period of time corresponding to a 90°-turn of the rotary drum.

When reproducing the tape according to the double scanning method, each of the heads scans the tape while moving by a distance of about ½ of the track width W for each trace, i.e., by a distance of about ½ of that moved at the time of the reproduction in the standard mode. When a track having azimuth different from that of the trace head is scanned, it is not possible to detect the synchronizing signal. Accordingly, the control circuit 11 does not supply the sampling pulses SP1 and SP2.

When the heads scan the tracks in the manner shown in FIGS. 3 and 4, two traces out of the continuous four traces, are the traces in which the heads have scanned, substantially in the on-track manner, tracks each having the same azimuth as that of each of the heads.

More specifically, in the case shown in FIG. 3, the first trace Ha1 and the second trace Hb1, shown by the solid lines, out of the continuous four traces Ha1, Hb1, Ha2, Hb2, are the traces in which the heads have scanned, substantially in the on-track manner, the tracks A and B each having the same azimuth as that of each of the heads. The third trace Ha2 and the fourth trace Hb2, shown by the broken lines, are the traces in which each of the heads has scanned the track B or A having different azimuth from that of each of the heads.

In the case shown in FIG. 4, the first trace Ha1 and the fourth trace Hb2, shown by the solid lines, out of the continuous four traces Ha1, Hb1, Ha2, Hb2 are the traces in which the heads have scanned, substantially in the on-track manner, the tracks A and B each having the same azimuth as that of each of the heads. The second trace Hb1 and the third trace Ha2, shown by the broken lines, are the traces in which each of the heads has scanned the track B or A having different azimuth from that of each of the heads.

In the case shown in FIG. 3, in the next four traces Ha3.... to the head trace Hb2, the first trace Ha3 and the second trace are the traces in which the heads have scanned, substantially in the on-track manner, the tracks each having the same azimuth as that of each of the heads.

In the case shown in FIG. 4, in the next four traces to the head trace Hb2, the first trace and the fourth trace are the traces in which the heads have scanned, substantially in the on-track manner, the tracks each having the same azimuth as that of each of the heads.

Accordingly, in either case shown in FIG. 3 or FIG. 4, continuous two traces are the traces in which the heads have scanned, substantially in the on-track manner, the tracks each having the same azimuth as that of each of the heads, and the subsequent two traces are the traces in which each of the heads has scanned a track having different azimuth from that of each of the heads.

When tracking control is made such that the trace positions as shown in FIGS. 3 and 4 are provided, the tracks A and B are scanned substantially in the on-track manner by the heads each having the same azimuth as that of each of the tracks.

It is now supposed that the heads each having the same azimuth as that of each of the tracks A and B are designated by HA and HB, respectively. The heads may be automatically brought to the trace positions as shown in FIG. 3, basically, by the following arrangement in which:

(i) for every continuous two traces provided by the heads HA and HB in this order, the supply of the sampling pulses SP1 and SP2 to the sampling and holding circuits 5 and 7 is inhibited for the next two traces provided by the heads HA and HB, thereby to stop the sampling of the pilot components Pr and Pl; and (ii) consequently, it is repeated for a short cycle of every four traces that the tracking position in the traces Ha1 and Hb1 is moved left and right as compared with the tracking position at the time when the supply of the sampling pulses SP1 and SP2 is not inhibited.

The heads may also automatically brought to the trace positions as shown in FIG. 4, basically, by the following arrangement in which:

(i) for every continuous two traces respectively provided by the heads HA and HB, the supply of the sampling pulses SP1 and SP2 to the sampling and holding circuits 5 and 7 is inhibited for the next two traces provided by the heads HA and HB, thereby to stop the sampling of the pilot components Pr and Pl; and (ii) consequently, it is repeated for a short cycle of every four traces that the tracking position in the traces Ha1 and Hb2 is moved left and right as compared with the tracking position provided at the time when the supply of the sampling pulses SP1 and SP2 is not inhibited.

At the time of reproduction in the long-time mode, the heads may be brought to the trace positions shown in FIG. 3 and FIG. 4, by the following arrangement in which:

(i) based on the RFSW signal of the input terminal 12, the gate circuit 13 generates, for every two traces, an inhibition gate signal having a length corresponding to the time required for generating two traces; and (ii) based on this gate signal, the sampling pulses SP1 and SP2 supplied from the control circuit 11 are intermittently supplied to the sampling and holding circuits 5 and 7, respectively.

More specifically, when bringing the heads to the tracking positions shown in FIG. 3, the supply of the sampling pulses SP1 and SP2 from the gate circuit 13 may be inhibited for two traces Ha2 and Hb2 out of the continuous four traces Ha1, Hb1, Ha2 and Hb2, and the gate circuit 13 may supply the sampling pulses SP1 and SP2 for two traces Ha1 and Hb1. The sampling and holding circuits 5 and 7 sample the input signals for the two traces Ha1 and Hb1 and stops sampling the input signals for the two traces Ha2 and Hb2.

Based on a shift between the tracking direction and the scanning direction, the ATF areas ATF2 of the traces Ha1 and Hb1 at the terminal ends thereof are shifted left (to the preceding-trace side) with respect to the ATF areas ATF1 of the traces Ha1 and Hb1 at the starting ends thereof. Accordingly, the tracking error signals respectively supplied at the time when the ATF areas ATF1 and ATF2 of the trace Ha1 are scanned, vary according to the characteristics respectively shown by broken lines $\alpha 1$ and $\alpha 2$ in FIG. 6. The tracking error signals respectively supplied at the time when the ATF areas ATF1 and ATF2 of the trace Hb1 are scanned, vary according to the characteristics respectively shown by broken lines $\beta 1$ and $\beta 2$ in FIG. 6.

The tracking control achieved by the error signals shown by the broken lines $\alpha 1$ and $\alpha 2$ has composite characteristics shown by an alternate long and short dash line $\alpha 12$. The tracking control achieved by the error signals shown by the broken lines $\beta 1$ and $\beta 2$ has composite characteristics shown by an alternate long and short dash line $\alpha 12$. The tracking control achieved by the error signals shown by the broken lines $\alpha 12$ and $\beta 12$ has composite characteristics shown by the solid line in FIG. 6.

The tracking positions are servo-controlled based on the tracking error signals shown by the broken lines $\alpha 1$, $\alpha 2$, $\beta 1$ and $\beta 2$. By this control, the tracking positions of the heads HA and HB are brought to the positions where the level of the error signal having the composite characteristics shown by the solid line in FIG. 6, reaches substantially zero, i.e., the positions substantially shown in FIG. 3.

On the other hand, when bringing the heads to the tracking positions shown in FIG. 4, the gate circuit 13 may be inhibited from supplying the sampling pulses SP1 and SP2 for two traces Hb1 and Ha2 out of the continuous four traces Ha1, Hb1, Ha2 and Hb2. In this case, the tracking positions are servo-controlled based on the tracking error signals having the characteristics similar to those shown by the broken lines $\alpha 1$, $\alpha 2$, $\beta 1$ and $\beta 2$. By such control, the tracking positions of the heads HA and HB are brought to the positions substantially shown in FIG. 4.

The description is now made of the case where the heads are to be brought to the tracking positions shown in FIG. 4.

Figure 6:
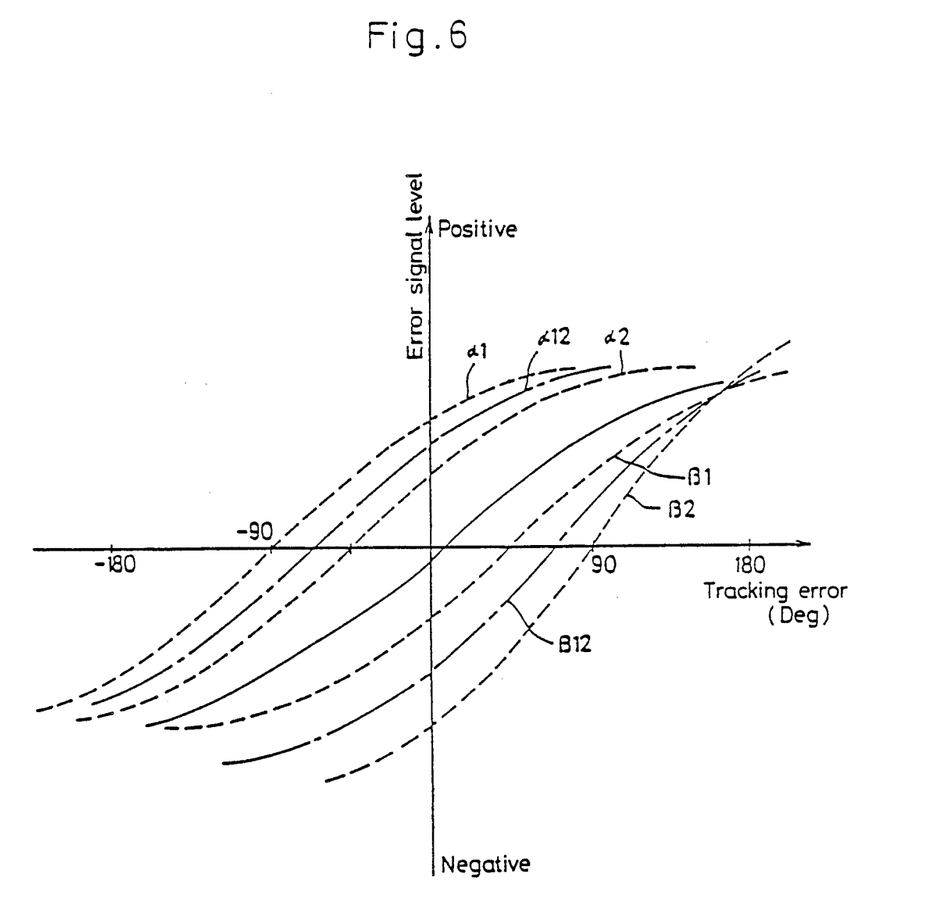
FIG. 6 and FIG. 7 are views of tracking characteristics illustrating the control operation made by the embodiment shown in FIG. 1.

For example, in continuous two traces comprising:

(i) the trace HbO of the head HB immediately before the trace Ha1 (preceding trace); and (ii) the trace Ha1 (succeeding trace), the tracking error signals supplied for the ATF areas ATF1 and ATF2 of the preceding trace HbO have characteristics equivalent to those shown by the broken lines $\alpha 1$ and $\alpha 2$ in FIG. 6. The tracking error signals supplied for the ATF areas ATF1 and ATF2 of the succeeding trace Ha1 have characteristics equivalent to those shown by the broken lines $\beta 1$ and 62 2 in FIG. 6.

When, for every continuous two traces, the supply of the sampling pulses SP1 and SP2 is inhibited during the next two traces, the tracking control is made based on the tracking error signal obtained by the immediately previous sampling operation, i.e., (i) in the case shown in FIG. 3, the tracking error signal obtained for the second ATF area ATF2 at the terminal end side of the succeeding trace Hb1 out of the continuous two traces Ha1 and Hb1, or (ii) in the case shown in FIG. 4, the tracking error signal obtained for the second ATF area ATF2 at the terminal end side of the succeeding trace Ha1 out of the two continuous traces, for example, the trace Ha1 and the trace HbO of the head HB before the trace Ha1.

Accordingly, the control made based on the tracking error signal obtained for the second ATF area ATF2 at the terminal end side of the succeeding trace, is continued for a longer period of time than that of the control made based on the tracking error signals obtained for both ATF areas ATF1 and ATF2 of the preceding trace and the tracking error signal obtained for the first ATF area ATF1 at the starting end side of the preceding trace.

In either case shown in FIG. 3 or 4, the tracking control based on the tracking error signal obtained for the second ATF area ATF2 of the succeeding trace has the characteristics shown by the broken line 82 in FIG. 6. At this time, the tracking control made based on the signal shown by the broken line B2 produces a tracking shift greater than that in the tracking control made based on the tracking error signal obtained for the first ATF area ATF1 of the same trace, the last-mentioned tracking control having the characteristics substantially shown by the broken line 81 in FIG. 6. Accordingly, the first-mentioned tracking control as apparently offset, and the general tracking characteristics deviate from the optimum characteristics passing through the original point as shown by the solid line in FIG. 6.

In view of the foregoing, the present invention is characterized in that the gate circuit 13 is inhibited from supplying the sampling pulse SP2 for the second ATF area ATF2 of the succeeding trace.

More specifically, the description is now made of the case where the heads are to be brought to the tracking positions shown in FIG. 3.

For example, in continuous four traces Ha1, Hb1, Ha2, and Hb2, the gate circuit 13 is inhibited from supplying:

(i) the sampling pulse SP2 for the second ATF area ATF2 of the succeeding trace Hb1 out of the continuous two traces Ha1 and Hb1; and (ii) the sampling pulses SP1 and SP2 for both ATF areas ATF1 and ATF2 of the next two traces Ha2 and Hb2.

In this case, the gate circuit 13 supplies the sampling pulses SP1 and SP2 in the timings shown in FIG. 5 (d) and (e), respectively, and the sampling operation of a tracking error signal by the sampling and holding circuit 7 based on the sampling pulse SP2 is stopped for the second ATF area ATF2 of the trace Hb1 and for both ATF areas ATF1 and ATF2 of the traces Ha2 and Hb2.

Accordingly, there is not made the tracking control based on the tracking error signal shown by the broken line $\beta 2$ in FIG. 6, but there is made, for continuous three traces Hb1, Ha2, Hb2, the tracking control based on the tracking error signal shown by the broken line $\beta 1$ in FIG. 6, i.e., based on a tracking error signal having a relatively less shift. In this case, the tracking characteristics corresponding to those shown in FIG. 6 are changed to those shown in FIG. 7.

In FIG. 7, signals respectively shown by broken lines $\alpha 1'$, $\alpha 2'$, $\beta 1'$ and an alternate long and short dash line $\alpha 12'$ are respectively corresponding to those shown by the broken lines $\alpha 1$, $\alpha 2$, $\beta 1$ and the alternate long and short dash line $\beta 12$ in FIG. 6.

By the tracking control based on the tracking error signals shown by the broken lines $\alpha 1'$, $\alpha 2'$, $\beta 1'$ in FIG. 7, correction is made such that the offset mentioned earlier becomes zero. Thus, the general tracking control has optimum S-shape characteristics passing through the original point as shown by the solid line in FIG. 7. This enables to achieve a high-precision tracking control. Accordingly, the heads HA and HB are brought substantially to the on-track position one time for every two traces such that the tracks A and B are reproduced with a proper tracking control performed.

On the other hand, when bringing the heads to the tracking positions shown in FIG. 4, the gate circuit 13 is inhibited from supplying the sampling pulse SP2 for the second ATF area ATF2 of the trace Ha1 and the sampling pulses SP1 and SP2 for the ATF areas ATF1 and ATF2 of two traces Hb1 and Ha2. At this time too, there is not carried out a tracking control based on the tracking error signal shown by the broken line $\beta 2$ in FIG. 6, as mentioned earlier. Instead, there is carried out a tracking control generally having the characteristics substantially the same as that shown by the solid line in FIG. 7. This achieves a high-precision tracking control when reproducing the tracks A and B.

Accordingly, in the embodiment above-mentioned, the gate circuit 13 is inhibited from supplying, for every continuous two traces of the heads HA and HB or for every continuous two traces of the heads HB and HA:

(i) the sampling pulse SP2 for the second ATF area ATF2 of the succeeding trace, and (ii) the sampling pulses SP1 and SP2 for the subsequent continuous two traces, to the sampling and holding circuits 5 and 7.

This prevents the sampling and holding circuit 7 from carrying out a sampling operation for the second ATF area ATF2 of the succeeding trace and for the first and second ATF areas ATF1 and ATF2 for the subsequent continuous two traces.

Thus, according to the tracking characteristics shown by the solid line in FIG. 7, a high-precision tracking control is made such that the heads HA and HB are brought to the tracking positions shown in FIG. 4 or FIG. 5. Accordingly, with a simple arrangement of adding the gate circuit 13, a good reproduction by the double scanning method may be achieved according to a high-precision tracking control.

When control as shown, for example, in FIG. 3, is made, the following is apparent from FIG. 7:

(i) The tracking control made based on the tracking error signals shown by the broken lines a1' and a2' in FIG. 7 has the composite characteristics shown by the alternate long and dash line α12', i.e., such characteristics that the trace position of the head HA is pulled in a direction toward the track A;

(ii) The tracking control made based on the tracking error signal shown by the broken line β1' in FIG. 7 has such characteristics that the trace position of the head HB is pulled in a direction toward the track B.

Accordingly, even though either one of the heads HA and HB should get clogged, failing to reproduce the tape, the tracking control is made based on the tracking error signals such that the other head capable of operating for reproduction is brought to the on-track position. This achieves a relatively good reproduction.

Further, even though the synchronizing signal cannot be detected for either one of the ATF areas ATF1 and ATF2 due to drop-out or the like, (i) the tracking control may be made with the tracking error signal shown by the broken line α2' in FIG. 7 when no detection can be made at the ATF area ATF1, and (ii) the tracking control may be made with the tracking error signals shown by the broken lines β1' and β1' in FIG. 7 when no detection can be made at the ATF area ATF2.

In either case, a relatively good reproduction may be made.

In the embodiment above-mentioned, the description has been made with the present invention applied to the R-DAT. However, the present invention may be applied to a method of reproducing a rotary head type tape recorder in which the reproduction tracking control is made according to the area division type ATF method of which format is different from that of the R-DAT. In this case, it is a matter of course that the travelling speed, the revolution speed and the like determined for the long-time mode may be different from those described in the embodiment above-mentioned.

What is claimed is:

1. A method of reproducing a recording from a rotary head type tape recorder comprising the steps of:

helically scanning a moving magnetic tape, wound on a rotary drum at a predetermined angle, by a pair of rotary magnetic heads each having plus or minus azimuth, said rotary magnetic heads disposed on said rotary drum separated from each other by 180° at a peripheral edge of said drum;

successively generating tracks in a guard bandless manner on said magnetic tape during recording, each of said tracks having a width smaller than a gap width of each of said heads;

forming ATF areas on each of said tracks at starting and terminal ends thereof, in each of said ATF areas at least (i) a synchronizing signal as a sampling reference signal and (ii) a pilot signal as a tracking signal are recorded in a pattern repeated over a period of several tracks in which frequency and recording length of each signal vary;

sampling, at the time of reproduction, crosstalk components of said pilot signals from two tracks adjacent to a trace track, based on detecting said synchronizing signals of said trace track at the starting and terminals ends thereof;

generating a tracking control signal proportional to a difference in level between said crosstalk components;

holding said tracking control signal until a next sampling is carried out; and controlling the tape movement based on said tracking control signal, therein to achieve tracking control of said heads, wherein when reproducing a magnetic tape which has been recorded in a long-time mode in which a tape travelling speed and a drum revolution speed are respectively set to ½ of a standard travelling speed and ½ of a standard revolution speed, said method further comprising the steps of setting the tape travelling speed to ½ of said standard travelling speed, and setting the drum revolution speed to said standard revolution speed;

setting a number of traces for every continuous two tracks of the magnetic tape to four traces;

for every said four traces, stopping said sampling at said terminal end of the second trace and stopping said sampling for the third and fourth traces; and repeating three samplings at starting and terminal ends of the first trace and at a starting end of the second trace to achieve track control.

2. A method of reproducing a recording from a rotary head type tape recorder comprising the steps of:

helically scanning a moving magnetic tape, wound on a rotary drum at a predetermined angle, by a pair of rotary magnetic heads each having plus or minus azimuth, said rotary magnetic heads disposed on said rotary drum separated from each other by 180° at a peripheral edge of said drum;

successively generating tracks inn a guard bandless manner on said magnetic tape during recording, each of said tracks having a width smaller than a gap width of each of said heads;

forming ATF areas on each of said tracks at the starting and terminal ends thereof, in each of said ATF areas at least (i) a synchronizing signal as a sampling reference signal and (ii) a pilot signal as a tracking signal are recorded in a pattern repeated over a period of several tracks in which frequency and recording length of each signal vary;

sampling, at the time of reproduction, crosstalk components of said pilot signals from two tracks adjacent to a trace track, based on detecting said synchronizing signals of said trace track at the starting and terminal ends thereof;

generating a tracking control signal proportional to a difference inn level between said crosstalk components;

holding said tracking control signal until a next sampling is carried out; and controlling the tape movement based on said tracking control signal, therein to achieve tracking control of said heads, wherein when reproducing a magnetic tape which has been recorded in a long-time mode in which a tape travelling speed and a drum revolution speed are respectively set to ½ of a standard travelling speed and ½ of a standard revolution speed, said method further comprising the steps of setting the tape travelling speed to ½ of said standard travelling speed, and setting the drum revolution speed to said standard revolution speed;

setting a number of traces for every continuous two tracks of the magnetic tape to four traces;

for every said four traces, stopping said sampling st said terminal end of the first trace and stopping said sampling for the second and third traces; and repeating three samplings at a starting end of the first trace and at starting and terminal ends of the fourth trace to achieve tracking control.

3. A method of reproducing a recording from a rotary head type tape recorder as set forth n claim 1 or 2, further comprising the steps of varying the frequency of each of the synchronizing signals alternatively for every track, varying the recording length of each of said synchronizing signals for every two tracks, and repeating the signal allocation pattern over a period of four tracks.

4. A method of reproducing a recording from a rotary head type tape recorder as set forth in claim 3, further comprising the steps of setting a winding angle of a magnetic tape on the rotary drum to 90°, and setting a width of each track of a magnetic tape to $\frac{2}{3}$ of the gap width of each magnetic head.

5. A method of reproducing a recording from a rotary head type tape recorder as set forth in claim 1 or 2, further comprising the steps of setting a winding angle of a magnetic tape on the rotary drum to 90°, and setting a width of each track of a magnetic tape to $\frac{2}{3}$ of the gap width of each magnetic head.

* * * * *

UNITED STATES PATENT AND TRADEMARK OFFICE
CERTIFICATE OF CORRECTION

PATENT NO. : 4,991,035

DATED : February 5, 1991

INVENTOR(S) : Tetsuya TAKI

It is certified that error appears in the above-identified patent and that said Letters Patent is hereby corrected as shown below:

On the cover page, Item [54] "REPRODUCING A RECORDING FROM A ROTARY HEAD TYPE TAPE RECORDER WITH TRACKING CONTROL" should read -- METHOD OF REPRODUCING A RECORDING FROM A ROTARY HEAD TYPE TAPE RECORDER WITH TRACKING CONTROL --.

Signed and Sealed this

Fifteenth Day of December, 1992

*Attest:*

DOUGLAS B. COMER

*Attesting Officer*      *Acting Commissioner of Patents and Trademarks*